United States Patent [19]

Hinves et al.

[11] 3,839,984
[45] Oct. 8, 1974

[54] SAFE AND ARM MECHANISM FOR AN EMBEDMENT ANCHOR PROPELLANT

[75] Inventors: John R. Hinves, Somerset; David J. Pimental, South Dartmouth, both of Mass.

[73] Assignee: The United States of America as represented by the Secretary of the Navy, Washington, D.C.

[22] Filed: May 29, 1973

[21] Appl. No.: 364,986

[52] U.S. Cl. .............................. 114/206 A, 102/16
[51] Int. Cl. .......................................... B63b 21/28
[58] Field of Search ............ 114/206 A, 206 R, 197; 9/9, 325; 102/7, 16, 81, 18; 89/1 B

[56] References Cited
UNITED STATES PATENTS

| | | | |
|---|---|---|---|
| 2,850,974 | 9/1958 | Abrev | 102/81 UX |
| 2,859,696 | 11/1958 | Burg | 102/7 |
| 3,015,270 | 1/1962 | Domingas et al. | 102/7 |
| 3,018,751 | 1/1962 | Spurlock | 114/197 |
| 3,154,042 | 10/1964 | Thomason et al. | 114/206 A |
| 3,218,927 | 11/1965 | Stoff | 89/1 B |
| 3,276,368 | 10/1966 | Tower et al. | 114/206 A |
| 3,285,170 | 11/1966 | Fietelaars | 102/7 |
| 3,391,639 | 7/1968 | Bochman | 102/7 |
| 3,532,057 | 10/1970 | Aubrey | 102/7 |

*Primary Examiner*—Duane A. Reger
*Assistant Examiner*—Galen L. Barefoot
*Attorney, Agent, or Firm*—Richard S. Sciascia

[57] ABSTRACT

A safe and arm mechanism, for igniting a propellant charge in an embedment anchor which comprises an out-of-line slider housing, two detonators, two adjustable ball release firing pins housed in a chamber above the detonators and actuated by a common piston, and a solenoid valve to admit water under pressure into the chamber. The solenoid valve receives its energy from the surface over a twin-conductor cable. When the mechanism is lowered in water beyond a certain depth after releasing the safety pin, a detonator plunger is moved under hydrostatic pressure so as to bring the detonators in line with the firing pins. When the solenoid valve is actuated by providing power to the solenoid valve, the firing pins are made to strike the detonators, thus setting off the propellant in the anchor barrel and driving the anchor firmly into the ocean floor.

5 Claims, 1 Drawing Figure

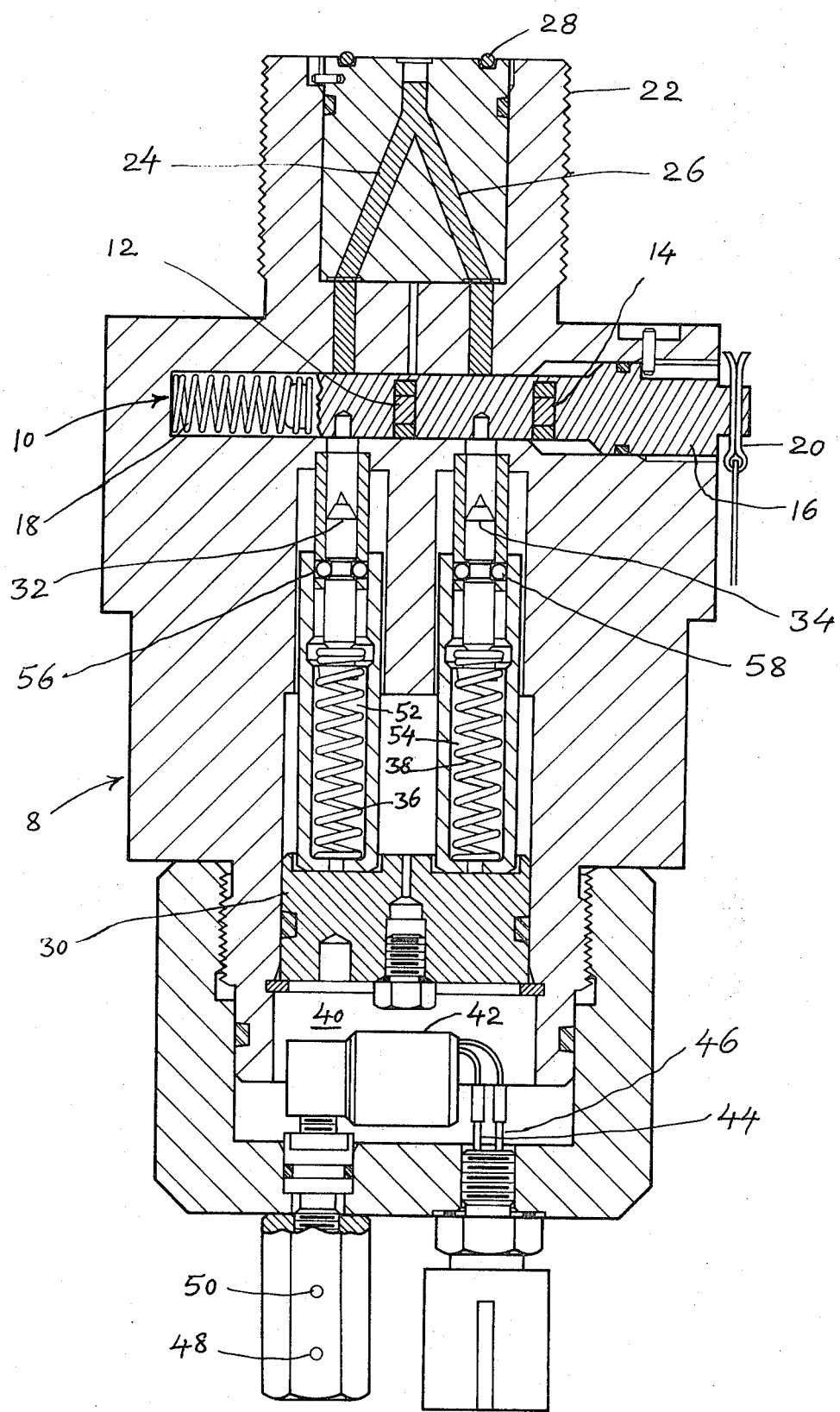

SAFE AND ARM MECHANISM FOR AN EMBEDMENT ANCHOR PROPELLANT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an embedment salvage anchor and more particularly to a safe and arm mechanism, hereinafter called S&A mechanism, for igniting a propellant charge in an embedment anchor so as to drive the anchor firmly and securely into the ocean floor.

Because of the serious limitations of conventional anchors and the desirability of making mooring equipment lighter and more reliable, a considerable effort has been made to improve undersea anchoring through the use of propellant driven anchors. Consequently, S&A mechanisms for igniting propellant charges in embedment anchors have been developed which contain electric detonators, radiation filters, lead azide mild detonating fuzes and flat gasket water seals. However, such S&A mechanisms are expensive and have poor reliability. It is thus desirable to have a simple S&A mechanism for igniting propellant charges in an embedment anchor which has no electro-explosive elements and it is not susceptible to electromagnetic radiation.

SUMMARY OF THE INVENTION

The objects and advantages of the present invention are accomplished by using a simple S&A mechanism for igniting propellant charges in an embedment anchor. This S&A mechanism is simple and has no electro-explosive elements and is not susceptible to electromagnetic radiation. The S&A mechanism comprises an out-of-line slider which houses two detonators, two adjustable ball release firing pins housed in a chamber or cavity above the detonators, and a solenoid valve to admit water under pressure into the chamber or cavity fitted with a piston. The detonators are housed in a spring loaded plunger which is exposed to hydrostatic pressure after a safety pin to keep the plunger in position is removed and the mechanism is lowered in water, thus subjecting the plunger to hydrostatic pressure. Under a predetermined value of hydrostatic pressure which is attained below a certain depth of seawater, the spring-loaded plunger is moved so as to line up the detonators with the spring-biased firing pins. When the solenoid valve is actuated by a power source from the surface, water under pressure enters the cavity or chamber above the piston and forces the piston down. As the piston goes down, it imparts energy to the spring-biased firing pins, thus making a plurality of locking tubes reach the release point of the firing pins. The firing pins thus strike the detonators which in turn set off the propellant in the anchor barrel and thus drive the anchor into the sea bottom firmly and safely.

An object of this invention is to have an S&A mechanism for igniting a propellant charge in an embedment anchor which is simple and which is not susceptible to electromagnetic radiation.

Another object of this invention is to have an S&A mechanism which can be used for a whole family of embedment anchors.

Still another object of this invention is to combine the output of two independent detonators into a single output through a "Y" lead or opening to set off the propellant in the anchor barrel of an embedment anchor.

Still another object of this invention is to use a solenoid valve as means of providing a required hydrostatic pressure for firing underwater explosive packages in embedment anchors.

Another object of this invention is to make use of a ball release system to make the firing pins strike the detonators.

Other objects, advantages and novel features of the present invention will become apparent from the following detailed description of the invention when considered in conjunction with the accompanying drawing, the single FIGURE of which illustrates an improved S&A mechanism for igniting a propellant charge in an embedment anchor constructed in accordance with the teachings of the present invention.

DESCRIPTION OF A PREFERRED EMBODIMENT

A preferred embodiment of an S&A mechanism for igniting a propellant charge in an embedment anchor is shown in the attached FIGURE which comprises a body or a block 8 housing an out-of-line slider 10 having detonators 12 and 14. The detonators 12 and 14 are placed in the out-of-line slider 10 which are coupled to a spring-biased plunger 16 spring biased by spring 18. The plunger 16 is provided with a safety pin 20 which keeps the detonators 12 and 14 at fixed positions as shown in the FIGURE. Body or block 8 is threaded at its end 22 in order to couple it to the breech end of a barrel which forms an integral part of an embedment anchor. The out-of-line slider 10 also has a Y output lead or opening 24 which contains propellant material 26 therein. When S&A mechanism is not in use, a cap is put on end 22 thereof so as to keep foreign materials out of the S&A assembly. O-ring 28 is used to make the cap fit tightly over the block end 22. Block 8 further houses a piston 30 bearing upon a chamber fitted with two spring biased firing pins 32 and 34 by means of springs 36 and 38 respectively. The piston 30 is in communication with the chamber or cavity 40 which has a solenoid valve 42 housed therein. The solenoid valve 42 is energized by means of cables 44 and 46 which bring power from a surface source.

In operation, the S&A assembly is coupled to the breech of an embedment anchor at its end 22. Before lowering the assembly in water for use, safety pin 20 is removed and the S&A assembly, coupled to the embedment anchor, is lowered in water. At a predetermined depth of the water, sufficient hydrostatic pressure is developed which moves plunger 16 having detonators 12 and 14 in such a way that the detonators align themselves with the corresponding firing pins 32 and 34. As an example, sufficient hydrostatic pressure is developed when the S&A mechanism is lowered into the water below a depth of 30 feet. When power from an external surface source is applied to the solenoid valve 42, water is allowed to enter chamber 40 through holes 48 and 50. The water in chamber 40 develops sufficient hdyrostatic pressure on piston 30 which, in turn, exerts pressure on springs 36 and 38. As a result, locking tubes 52 and 54 move under the influence of this hydrostatic pressure reaching the ball points 56 and 58 respectively and thus moving the firing pins 32 and 34 beyond their locking positions so as to strike the detonators 12 and 14 respectively. The detonators in turn propel the propellant material 26 in Y lead or opening which in turn sets off the propellant in the anchor and thus drives the anchor into the bottom of the sea firmly and safely.

The S&A assembly thus comprises a spring-biased plunger having two detonators embedded therein, two firing pins biased by two corresponding firing pin springs which are in communication with a piston. Th piston is in communication with a cavity or chamber which has a solenoid valve means housed therein to keep seawater out of the chamber. The solenoid valve upon energization by an external source lets the seawater enter the chamber and apply hydrostatic pressure on the piston. The piston in turn moves the firing pins beyond their locked position and allows the firing pins to strike the detonators which are brought in alignment with the firing pins under hydrostatic pressure when the assembly is below a certain depth of water in the sea. The detonators in turn set off the charge in the Y lead which in turn sets off the propellant in the anchor barrel and drives the anchor into the bottom of the sea firmly and safely.

Obviously many modifications and variations of the present invention are possible in the light of the above teachings. As and example, alternative means can be used to keep firing pins in locking positions before energizing the solenoid valve to enable the firing pins to detonate the detonator. It is therefore to be understood that within the scope of the appended claims the invention may be practiced otherwise than as specifically described.

We claim:

1. A safe and arm mechanism for igniting a propellant charge in an embedment anchor which comprises:

a block having a first end and second end, said block adapted to be demountably coupled to the embedment anchor at said first end and having a longitudinal "Y" opening at said first end, a lateral opening adjacent said Y opening and away from said first end, and a pair of generally parallel longitudinal openings adjacent said lateral opening and away from said Y opening;

a pair of firing pins adjustably housed in said pair of generally parallel longitudinal openings in said block, said firing pins being longitudinally movable in generally parallel longitudinal openings;

chamber means having a first end and a second end, said first end of said chamber being adjustably coupled to said block adjacent said second end of said block;

an out-of-line slider adjustably positioned in said lateral opening in said block, said slider being selectively movable relative to said longitudinal openings and said Y opening to align said longitudinal openings, said firing pins and said Y opening;

a pair of detonators housed in said out-of-line slider;

a safety pin connected to said out-of-line slider to keep said pair of detonators in said out-of-line slider out of alignment with said pair of generally parallel longitudinal openings in said block;

a piston housed in said chamber, said piston being in communication with said pair of firing pins;

a solenoid valve means secured in said chamber proximate said second end of said chamber for selectively exposing said piston in said chamber to ambient hydrostatic chamber;

means for actuating said solenoid valve means.

2. The mechanism of claim 1 wherein said out-of-line slider comprises a plunger and a spring, said plunger being spring biased by means of said spring so as to keep said detonators out of alignment with said firing pins and said Y opening with said safety pin being in connection with said out-of-line slider.

3. The mechanism of claim 2 wherein said pair of firing pins are spring biased inside said pair of generally parallel longitudinal openings in said block.

4. The mechanism of claim 3 which includes means for keeping said pair of firing pins out of contact with said detonators until energization of said solenoid valve means.

5. The mechanism of claim 4 wherein said means for keeping out said pair of firing pins out of contact with said detonators until energization of said valve means includes a pair of locking tubes having locking positions therein for said firing pins.

* * * * *